(12) United States Patent
Eskridge et al.

(10) Patent No.: US 10,445,664 B2
(45) Date of Patent: Oct. 15, 2019

(54) SYSTEMS AND METHODS FOR NAVIGATING AND RESERVING BUILDING SPACES

(71) Applicant: Walmart Apollo, LLC, Bentonville, AR (US)

(72) Inventors: Michael Ryan Earl Eskridge, Bentonville, AR (US); Donald Lawrence Cook, III, Bentonville, AR (US); David Leroy Langford, Jr., Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 170 days.

(21) Appl. No.: 13/771,919

(22) Filed: Feb. 20, 2013

(65) Prior Publication Data

US 2014/0236642 A1     Aug. 21, 2014

(51) Int. Cl.
*G06Q 10/02*     (2012.01)

(52) U.S. Cl.
CPC .................................. *G06Q 10/02* (2013.01)

(58) Field of Classification Search
CPC ...... G06Q 10/02; G06Q 10/025; G06Q 30/02; G06Q 30/0601; G06Q 30/06
USPC ........................................................... 705/5
See application file for complete search history.

(56) References Cited

U.S. PATENT DOCUMENTS

| | | | | |
|---|---|---|---|---|
| 5,903,889 | A * | 5/1999 | de la Huerga | G06F 17/22 |
| 7,913,167 | B2 * | 3/2011 | Cottrille | 715/271 |
| 2004/0153334 | A1 * | 8/2004 | Dione | G06Q 30/02 |
| | | | | 705/323 |
| 2005/0246628 | A1 * | 11/2005 | Peterson | G06Q 10/00 |
| | | | | 715/200 |
| 2005/0261945 | A1 * | 11/2005 | Mougin et al. | 705/5 |
| 2006/0015376 | A1 * | 1/2006 | Sattler | G06Q 10/02 |
| | | | | 705/5 |
| 2007/0083572 | A1 * | 4/2007 | Bland | G06F 17/30563 |
| 2008/0109289 | A1 * | 5/2008 | Vivadelli et al. | 705/7 |
| 2008/0183483 | A1 * | 7/2008 | Hart | G06F 17/5004 |
| | | | | 705/1.1 |
| 2010/0125478 | A1 * | 5/2010 | Bisht | 705/8 |
| 2013/0090959 | A1 * | 4/2013 | Kvamme | G06Q 50/12 |
| | | | | 705/5 |
| 2014/0046716 | A1 * | 2/2014 | Black | G06Q 10/02 |
| | | | | 705/7.19 |
| 2014/0074873 | A1 * | 3/2014 | Ngo | G06F 17/30241 |
| | | | | 707/758 |

OTHER PUBLICATIONS

Rusli et al., Reservation Through Image Visualization, Aug. 14, 2006, International Conference on Computer Graphics, Imaging and Visualisation (CGIV'06), pp. 38-42 (Year: 2006).*

* cited by examiner

*Primary Examiner* — Rupangini Singh
(74) *Attorney, Agent, or Firm* — McCarter & English, LLP; David R. Burns (57) ABSTRACT

A computer-implemented method executed in a computational device to reserve a room in a building of a campus includes receiving input from a user identifying features associated with a room, retrieving floorplan level mapping information based on the input, retrieving floorplan level security information based on the input, generating a list of potential reservation locations based on the floorplan level mapping information and the floorplan level security information, and rendering at least a portion of the list of potential reservation locations to a screen.

15 Claims, 12 Drawing Sheets

SYSTEMS AND METHODS FOR NAVIGATING AND RESERVING BUILDING SPACES

BACKGROUND

Many organizations have campuses, buildings, and rooms dedicated to a plurality of different functions. Certain of the facilities may be used for internal purposes, such as research labs and secure data storage centers, which are designated only for secure internal use. Other facilities, such as meeting and guest rooms, may be designated for the use of visitors and members outside the organization's community.

Separately designating facilities for internal and external purposes limits the available space and equipment which may be used at any given time. Though the physical location of services and buildings may not change, their designations, functions, and security levels may be more efficiently reallocated over time. The situation may be further complicated by the fact that many organizations service a plurality of different visitors, such as vendors, who may each possess specific relationships with one another. Certain vendors may have access to resources shared by other vendors, but in some circumstances vendors may desire to have exclusive and confidential access to certain resources.

SUMMARY

According to an embodiment, a computer-implemented method executed in a computational device to reserve a room in a building of a campus includes receiving input from a user identifying features associated with a room, retrieving floorplan level mapping information based on the input, retrieving floorplan level security information based on the input, generating a list of potential reservation locations based on the floorplan level mapping information and the floorplan level security information, and rendering at least a portion of the list of potential reservation locations to a screen.

In some embodiments, the computer-implemented method may include receiving a user identification code. In some embodiments, receiving a user identification code may further include identifying a mobile device associated with the user. In some embodiments, the computer-implemented method may further include retrieving building level security information based on the user identification code. In some embodiments, the computer-implemented method may further include excluding at least a portion of the floorplan level mapping information, determined based on the floorplan level security information as being not accessible for the user identification code, from the generating a list of potential reservation locations. In some embodiments, the computer-implemented method may further include retrieving campus level security information based on the user identification code.

In some embodiments, the computer-implemented method may include retrieving campus level mapping information and building level mapping information. In some embodiments, the computer-implemented method may further include displaying an image in an image region based on the campus level mapping information, the building level mapping information, and/or the floorplan level mapping information.

According to an embodiment, a non-transitory computer readable medium include instructions configured to cause a computational device to receive input from a user identifying features associated with a room, the input being in digital form, retrieve floorplan level mapping information based on the input, retrieve floorplan level security information based on the input, generate a list of potential reservation locations based on the floorplan level mapping information and the floorplan level security information, and render at least a portion of the list of potential reservation locations to a screen.

In some embodiments, the non-transitory computer readable medium may include instructions further configured to cause a computational device to receive a user identification code. In some embodiments, receiving a user identification code may include identifying a mobile device associated with the user. In some embodiments, the non-transitory computer readable medium may further include instructions further configured to cause a computational device to retrieve building level security information based on the user identification code. In some embodiments, the non-transitory computer readable medium may further include instructions further configured to exclude at least a portion of the floorplan level mapping information, determined based on the floorplan level security information as being not accessible for the user identification code, from the generating a list of potential reservation locations. In some embodiments, the non-transitory computer readable medium may further include instructions further configured to cause a computational device to retrieve campus level security information based on the user identification code.

In some embodiments, the non-transitory computer readable medium may include instructions further configured to cause a computational device to retrieve campus level mapping information and building level mapping information. In some embodiments, the non-transitory computer readable medium may further include instructions further configured to cause a computational device to display an image in an image region based on the campus level mapping information, the building level mapping information, and/or the floorplan level mapping information.

According to an embodiment, a computerized reservation system for receiving a room reservation request includes a memory and a processor operatively connected to the memory. The memory includes instructions that when executed by the processor cause the processor to receive input from a user identifying features associated with a room, the input being in digital form, retrieve floorplan level mapping information based on the input, retrieve floorplan level security information based on the input, generate a list of potential reservation locations based on the floorplan level mapping information and the floorplan level security information, and render at least a portion of the list of potential reservation locations to a screen.

In some embodiments, the memory may include instructions that when executed by the processor cause the processor to receive a user identification code, retrieve building level security information based on the user identification code, and/or exclude at least a portion of the floorplan level mapping information, determined based on the floorplan level security information as being not accessible for the user identification code, from the generating a list of potential reservation locations.

DESCRIPTION OF EXEMPLARY EMBODIMENTS

Certain of the present embodiments contemplate systems, methods, and non-transitory computer-readable media for identifying, locating, and reserving facilities and equipment for users having a plurality of different access levels and relationships. Certain embodiments contemplate providing an application for mobile devices, such as personal cell phones and digital assistants, which cross-references floor plan and security information to facilitate efficient selection of available resources. The application can include a user interface designed to readily present information relevant to the offering, availability, and selection of different facilities and equipment.

Figure 1:
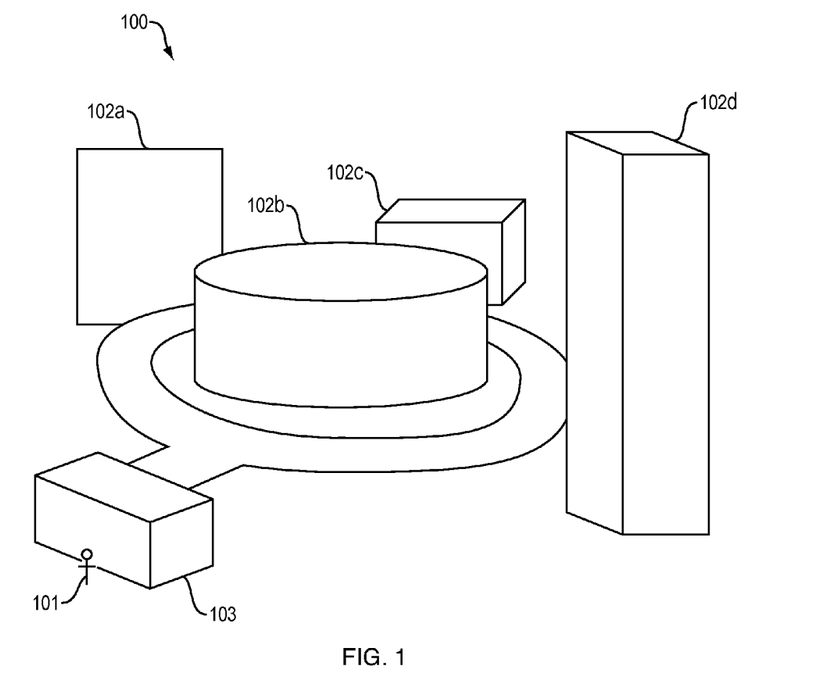
FIG. 1 is an exemplary view of a campus having a plurality of different buildings and facilities available for visitor and employee use.

FIG. 1 is a view of a campus 100 having a plurality of different buildings and facilities available for visitor and employee use. A visitor 101 may arrive on the campus 100 with one or more buildings 102a-d for a limited purpose, such as delivering a presentation or taking advantage of resources allocated for the visitor's 101 organization. Accordingly, visitor 101 may have limited security access to certain of the buildings 102a-d and not others, or to portions of buildings. Visitor 101 may be one of a plurality of visitors to the campus, who may each have different restrictions upon their access to facilities or portions of facilities in relation to one another. For example, Visitor A may have access to building 102a, but only when in the presence of Visitor B, during particular hours of the month, and without prior reservation by a Visitor C. Visitor 101 may desire to reserve a room in a facility to, for example, make a presentation to employees upon the campus. Were a receptionist to receive the visitor's 101 request and attempt to manually identify a suitable room in a facility, the opportunity for error would be considerable and an access violation would likely result. Additionally, a receptionist may be unable to identify all the available resources meeting a visitor's disparate criterion.

Accordingly, prior to arriving, or prior to exiting the entry gate 103 it may be desirable for the visitor 101 to have identified the facilities and resources to which they have access and to be properly directed to their location without passing through any unsecure locations. Certain embodiments contemplate an application accessible by mobile phone, or via kiosk at the entry gate 103, which receives the visitor's 101 inquiries and directs the visitor 101 to the appropriate location.

Figure 2:
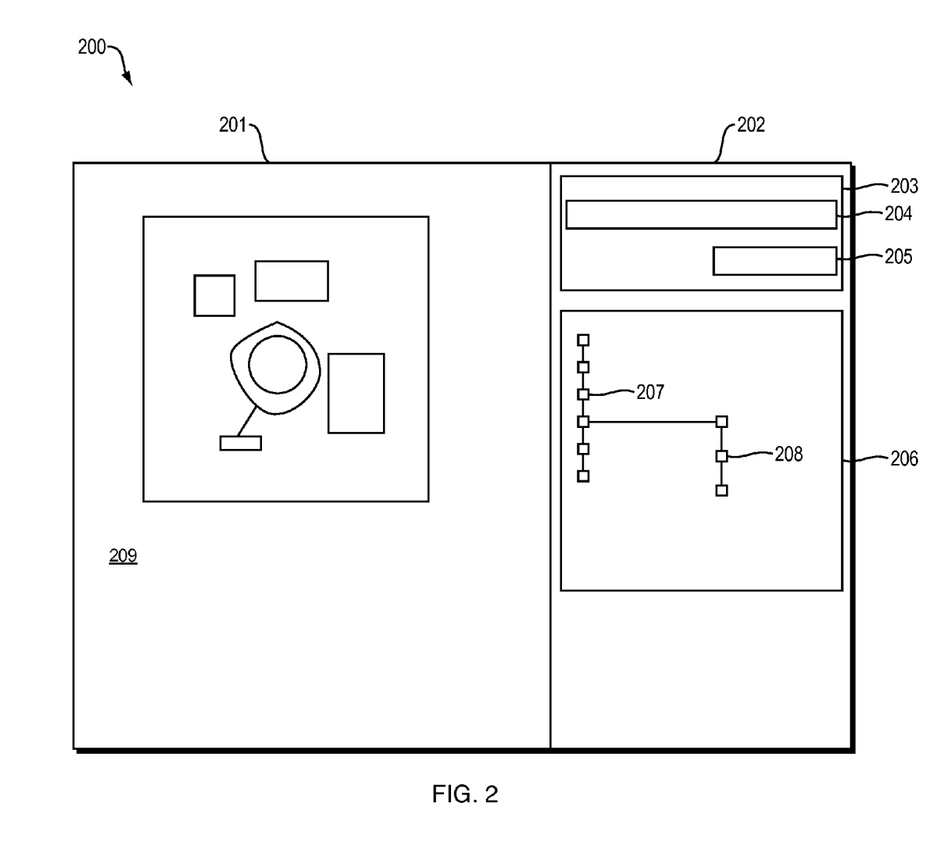
FIG. 2 is an exemplary image of a graphical user interface (GUI) which can be presented to a user in certain embodiments.

FIG. 2 is an example image depicting a graphical user interface 200 which may be presented to a user in certain embodiments. The interface 200 can include an image region 201 and a selection region 202. The image region 201 can display information regarding the campus as a whole, individual buildings, individual rooms, and the resources, facilities, and security restrictions associated with each. Here, the region 201 depicts a top-down view 209 of the whole campus from FIG. 1. In some embodiments, the user may click or tap on items in the display region 201 to request a reservation or to receive additional information regarding the item. The selection region 202 can include an input region 203 having text input boxes 204 for receiving search terms. A user can input a room number, or types of desired equipment into the text input box 204. The selection region 202 can also include drop-downs and other graphical user interface elements for locating and selecting desired search keywords. The selection region can also include a resource selection region 206 having several hierarchical nodes 207. Each node 207 can represent a category, such as room type, or equipment type. Selection of a category can produce a list of element nodes 208 or further sub-category nodes indicating further selections or choices within the selected category. Selecting an element node 208 can result in the initiation of a search for the item selected, or can add the item to a collection of features to be searched.

Figure 3:
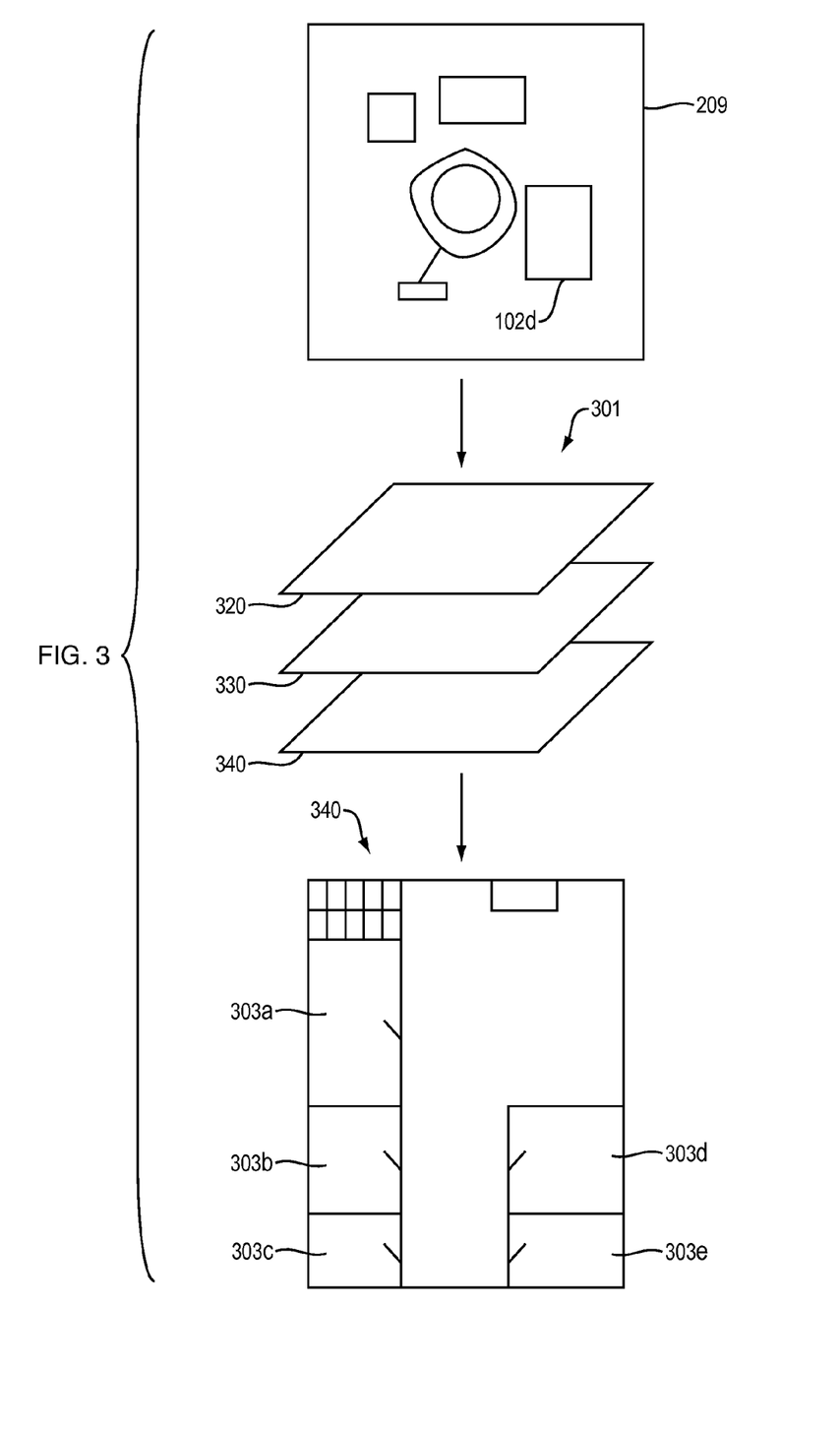
FIG. 3 is an exemplary diagram depicting the hierarchical relation between a campus-wide plan, building plan, and floor plan as can be used in certain of the embodiments.

FIG. 3 is an example diagram depicting a hierarchical relationship between a campus-wide plan 209, building plan 301 (e.g., for building 102 d), and floor plan 340 as can be used in certain of the embodiments. Each building 102 a-d in the campus-wide plan 209 can be associated with a respective building. For example, building 102 d can be associated with plan 301 which itself corresponds to a plurality of floor plans 320, 330, and 340. Each floor plan, such as plan 340 can itself be associated with a number of rooms 303 a-e and references to various facilities and equipment available on the floor. Each of the campus-wide plan 209, building plan 301, floor plan 340, and rooms 303 a-e can have corresponding designations in a security mapping. The security mapping can be stored in a security database, and can be separately stored from information regarding the campus-wide plan 209, building plan 301, floor plan 340, and rooms 303 a-e. The security mapping can indicate which individuals may have access to particular rooms and to particular equipment.

Figure 4:
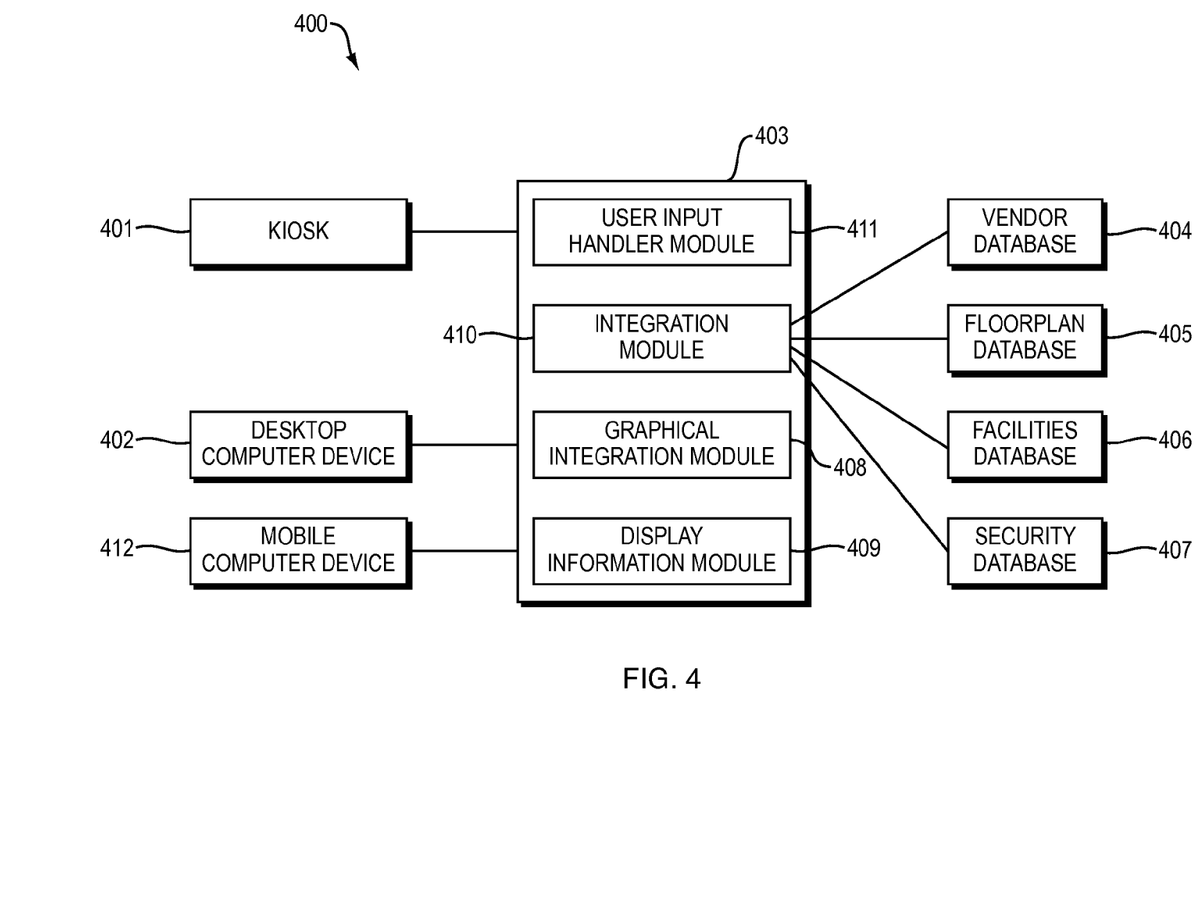
FIG. 4 is an exemplary block diagram depicting the relations between various modules stored in a computational device implementing and/or executing certain embodiments.

FIG. 4 is a systems level block diagram depicting the relations between various modules in a computational device 403 implementing certain embodiments. One example computational device is depicted in and discussed in relation to FIG. 10. The computational device 403 can be accessed with a kiosk 401 such as a kiosk located at the entry gate 103. The computational device 403 can also be accessed with desktop computer device 402 or mobile computer device 412, such as through the Internet via a website or application run locally to each device, such as a browser. The computational device 403 can make reference to each of a vendor or user database 404, a floorplan database 405, a facilities database 406, and security database 407. The databases 404-407 can be one or more SQL or other databases commonly known in the art. The computational device 403 can communicate with the databases 404-407 via an integration module 410. In some embodiments the integration module 410 may retrieve data from the databases 404-407 without reformatting the data therein, but in other embodiments the integration module 410 can reformat information from the form represented in the database into a form usable by other modules within the computational device 403. For example, in some embodiments the floorplan database 405 may be maintained by a third party, and may not readily represent or correspond to data from the security database 407. In these situations the integration module 410 can reformat data from each database to facilitate a correspondence therebetween. The display information module 409 can prepare information for display and render the information on a display, for example as GUI 200. This information can then be presented to the user via a kiosk 401, desktop computer device 402, or mobile computer device 412. A user input handler module 411 can similarly receive information from the user via kiosk 401, desktop computer device 402, or mobile computer device 412 and relay the information as a request to one of the databases 404-407. Graphical integration module 408 may reformat information from the integration module 410 to a form suitable for display on user, such as a vendor, desktop computer device 402 or mobile computer device 412.

Figure 5:
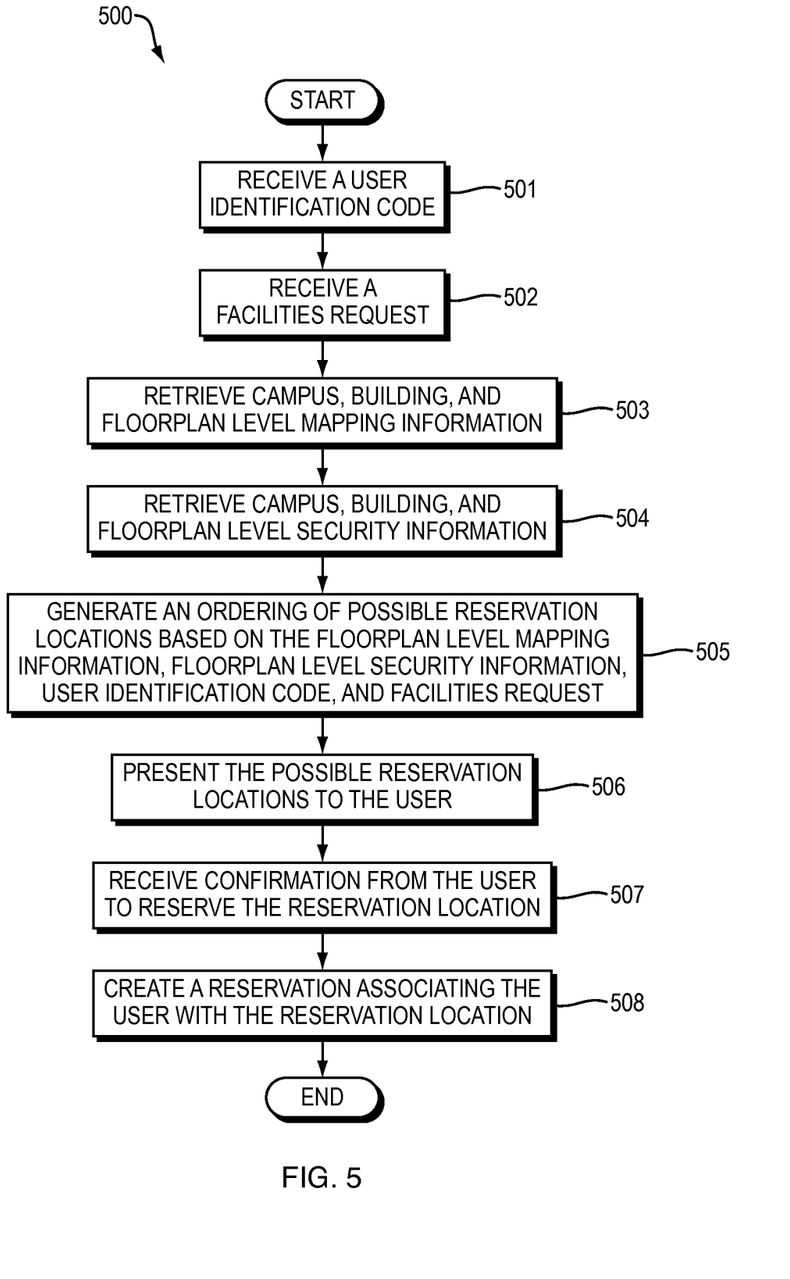
FIG. 5 is an exemplary flow diagram depicting various operations in a process implemented in certain of the disclosed embodiments.

FIG. 5 is a flow diagram depicting various operations in a process 500 implemented in certain of the disclosed embodiments. Process 500 can be implemented using a software application such as software application 1040 discussed in greater detail below. At step 501 the computational device 403 can receive a user identification code from the user, who may be one of a plurality of vendors. For example, the user can input their name, or a unique alphanumeric sequence associated with their affiliation to an organization. In some embodiments, a unique code associated with the user's mobile device, such as a Media Access Control address, can serve as a user identification code. At step 502, the computational device 403 can then receive a facilities request from the user. This operation can be accomplished through a searching process as described in relation to FIG. 2 and in greater detail below. The facilities request may, for example, be for a location having a whiteboard and air conditioning. At step 503, the computational device 403 can retrieve one or more of the campus, building, and floorplan level mapping information from various databases, in response to the query. At step 504 the computational device 403 can retrieve corresponding security information for the campus, building, and floorplan level mapping information. In step 505, the computational device 403 can then generate a partial or total ordering of potential reservation locations based on one or more of the floorplan mapping information, security information, user identification code, and facilities request.

At step 506, having identified potential reservation locations, the computational device 403 can present the user with all or a portion of the reservations list. At step 507, computational device 403 can receive confirmation from the user regarding the desired reservation. At step 508, computational device 403 can then create the selected reservation.

Figure 6:
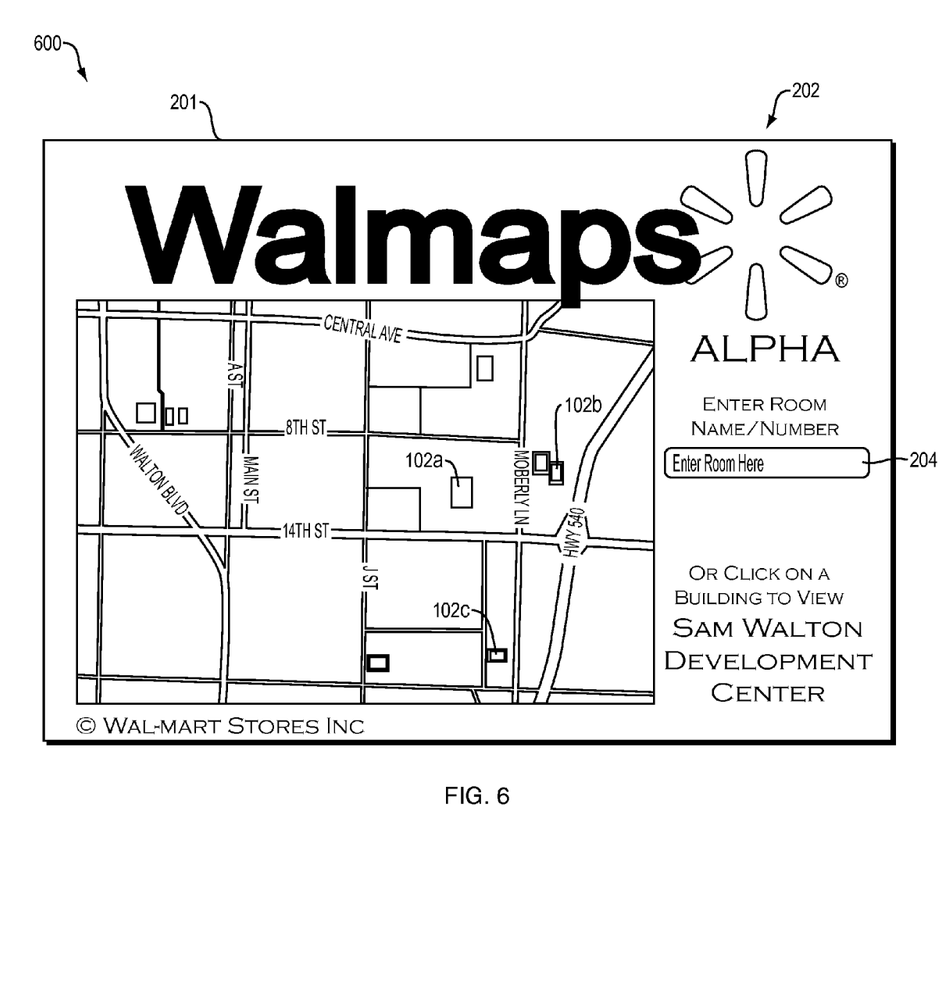
FIG. 6 is an example screenshot of a graphical user interface which can be presented to a user in certain embodiments.

FIG. 6 is an example screenshot of a GUI 600 which can initially be presented to a user in certain embodiments. Graphical user interface 600 may appear on a user device, such as desktop computer device 402, mobile computer device 412, or kiosk 401. As in the embodiment of FIG. 2, the GUI includes an image region 201 and a selection region 202 having a text input 204. The interface 600 can also receive user input in the image region 201, such as when users click or tap on the buildings 102a-c. Clicking or tapping on a building can confine the user's search to floorplans associated with that building's building plan. Prior to presenting the user with the building plan, the computational device 403 can first verify that the user is authorized to view the floorplans 320, 330, and 340 associated with the indicated building.

Figure 7:
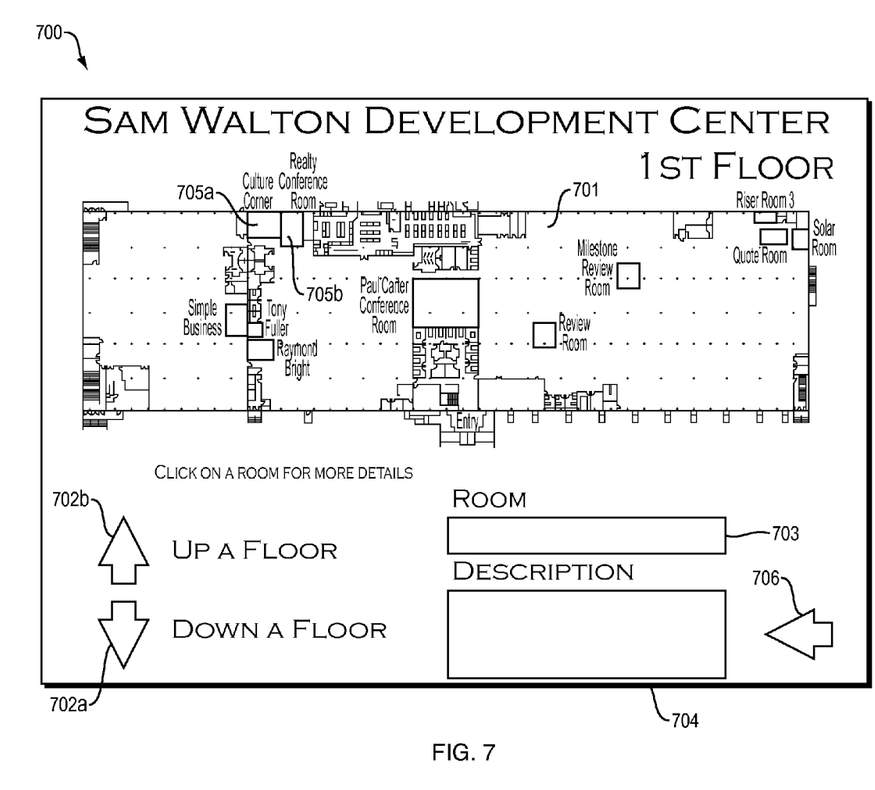
FIG. 7 is an example screenshot of a GUI which can be presented to a user in certain embodiments for floor-by-floor review of search results.

FIG. 7 is an example screenshot of a GUI 700 which can be presented to a user in certain embodiments for floor-by-floor review of search results. For example, having clicked or tapped a building 102a in the GUI 600 of FIG. 6, the user can then be presented with the top-most floor of the building in the image region 701 of the GUI 700. Graphical user interface 700 may appear on a user device, such as desktop computer device 402, mobile computer device 412, or kiosk 401. The user can iterate between the floors to which they have security access by selecting icons 702a and 702b, which may be scroll buttons down and up a floor respectively. All or portions of a floor can be obscured or eliminated to which the user has limited or no access. Once the user is viewing a floor, the user can enter a room name to search for at input 703. The user can also describe the characteristics of the room they are seeking for in search box 704. For example, the user may indicate the visitor capacity of the room, the existence of air conditioning, the existence of a projector, the existence of Internet access, etc. In some embodiments, when the user clicks or taps on a room in the image 701, the computational device 403 can populate each input field 703 and 704 with the name and descriptive elements of the selected room respectively. The rooms 705a-b can be color coded to indicate their availability, security access restrictions for the visitor, and/or correspondence to any entered search criterion. Selecting graphical user interface element 706 can return the user to the building selection screen 600 in some embodiments.

Figure 8:
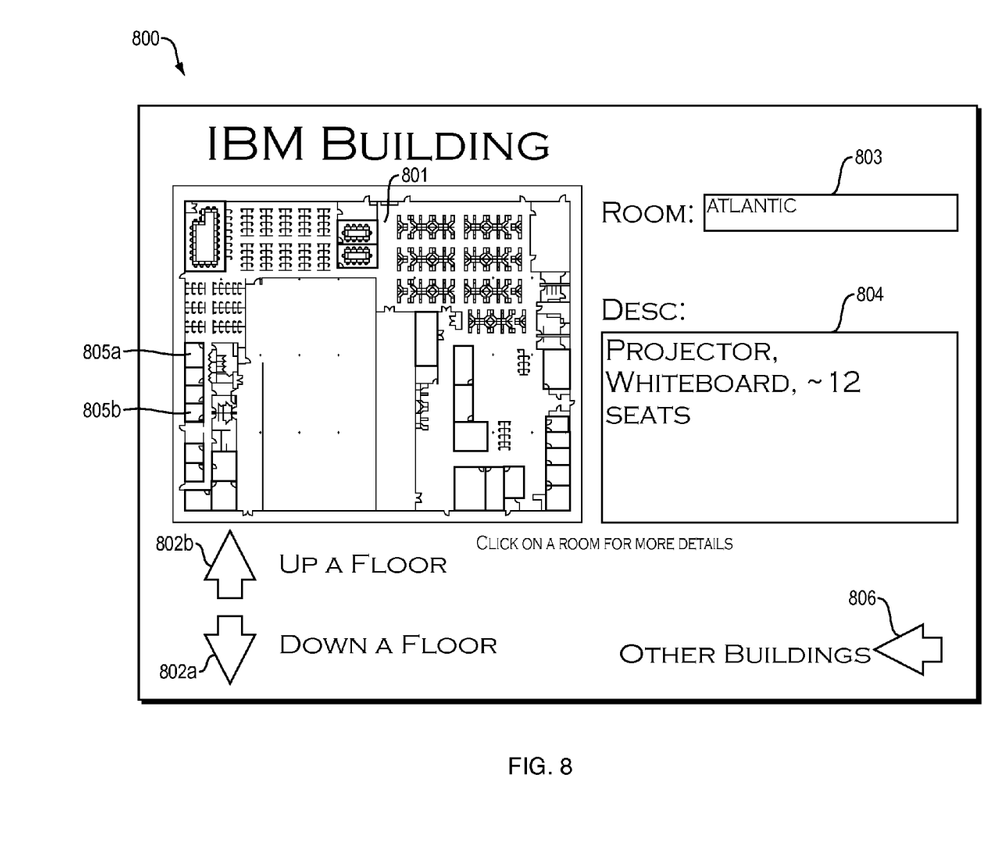
FIG. 8 is an example screenshot of a GUI which can be presented to a user in certain embodiments for floor-by-floor review of search results.

FIG. 8 is an example screenshot of a GUI which can be presented to a user in certain embodiments for room-by-room review of search results. In this example screenshot, the user has selected a room 801 having conference rooms 805a and 805b. In display region 803 the computational device 403 indicates the name of the selected conference room. In display region 804, the computational device 403 indicates the features and equipment available in this conference room. In this example, a projector, whiteboard, and seating for approximately twelve guests is available. The user can iterate between floors with scroll element 802a to move down a floor in the representation or scroll element 802b to move up a floor in the representation. The user can also search a different building by selecting graphical user interface element 806. Graphical user interface 800 may appear on a user device, such as desktop computer device 402, mobile computer device 412, or kiosk 401.

Figure 9:
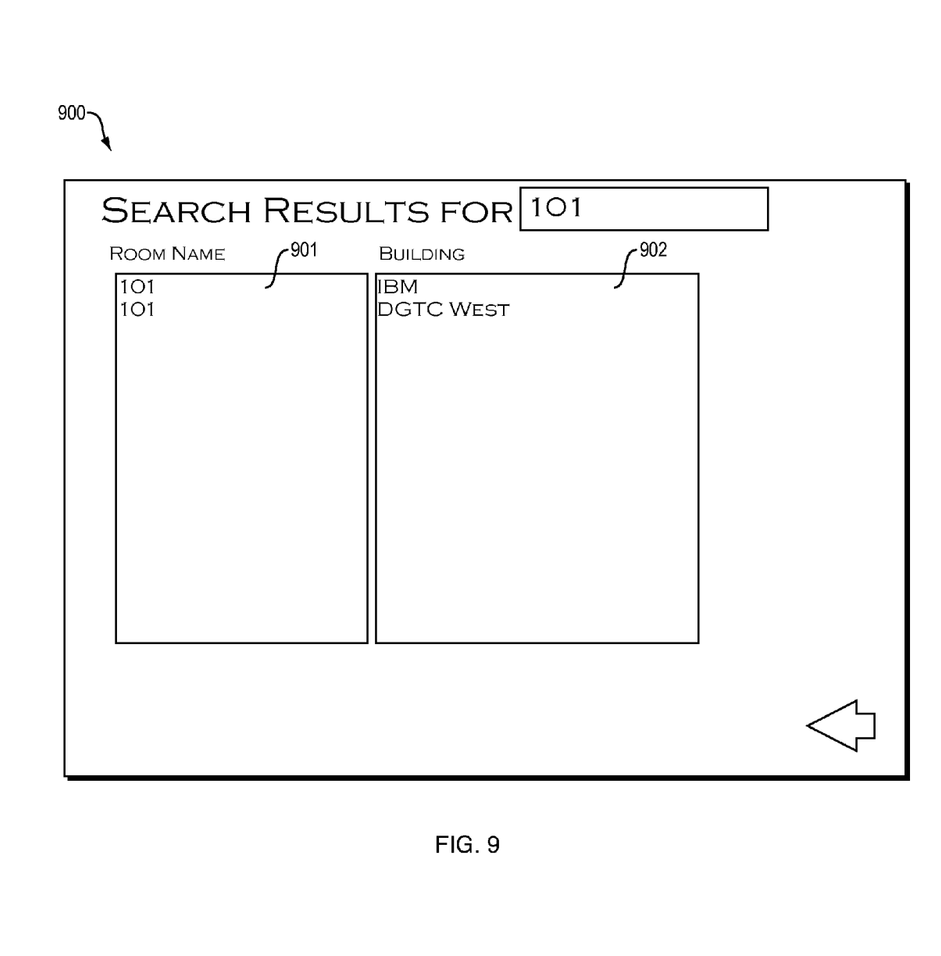
FIG. 9 is an example screenshot of a GUI depicting the results of a textual search as can be used in certain embodiments.

FIG. 9 is an example screenshot 900 rendered by display information module 409, of a GUI depicting the results of a textual search as can be used in certain embodiments. Here, the user has entered the search term "101" at an input such as an input to textbox 803 or input textbox 204. The computational device 403 received the input, processed the input, and responded by indicating the corresponding room names 901 (e.g., the room named "101") and building names 902. The buildings associated with names 902 can include one or more rooms associated with the search term "101". Similar displays for equipment and room characteristics can also be provided in certain embodiments.

Figure 10:
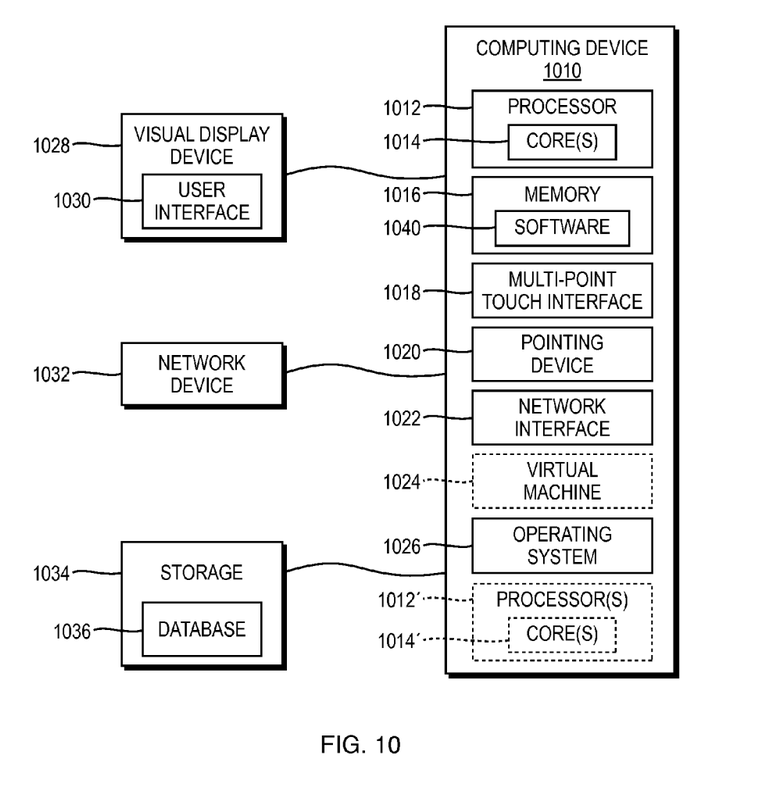
FIG. 10 is an example computational device block diagram depicting various of the components which can be used to implement various of the disclosed embodiments.

FIG. 10 is a block diagram of an exemplary computing device 1010 such as can be used, or portions thereof, in computational device 403. The computing device 1010 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is configured to perform various of the disclose operations. The computing device 1010 can also include configurable and/or programmable processor 1012 and associated core 1014, and optionally, one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as DRAM, SRAM, EDO RAM, and the like. Memory 1016 can include other types of memory as well, or combinations thereof.

A user can interact with the computing device 1010 through a visual display device 1028, such as a computer monitor, which can display one or more user interfaces 1030 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1028. The computing device 1010 can include other suitable conventional I/O peripherals.

The computing device 1010 can also include one or more storage devices 1034, such as a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 11:
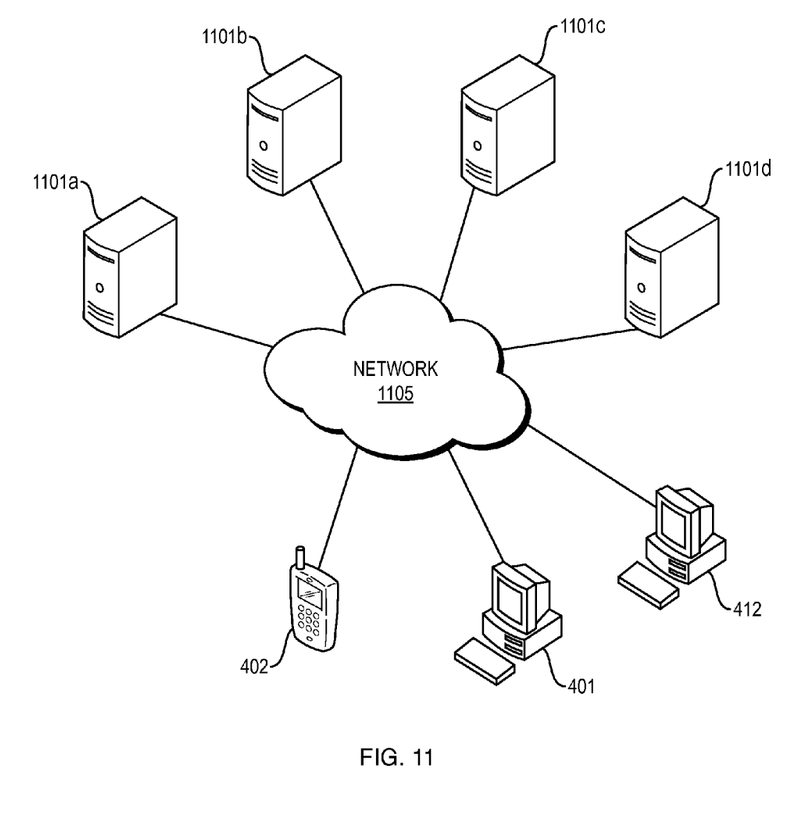
FIG. 11 is an example computational device block diagram depicting various of the components which can be used to implement various of the disclosed embodiments in a distributed system.

FIG. 11 is an example computational device block diagram of certain distributed embodiments. Although FIGS. 4, 10, and the exemplary discussion above, make reference to a single computational system 403, one will recognize that various of the modules within computational system 403 may instead be distributed across a network 1105 in separate server systems 1101*a-d* and possibly in user systems, such as kiosk 401, desktop computer device 402, or mobile computer device 412. For example, users may download an application to their desktop computer device 402 or mobile computer device 412, which is configured to perform the operations of the graphical integration module 408, display information module 409, and user input handler 411. In some distributed systems, the modules of computational device 403 can be separately located on server systems 1101*a-d* and can be in communication with one another across the network 1105.

Figure 12:
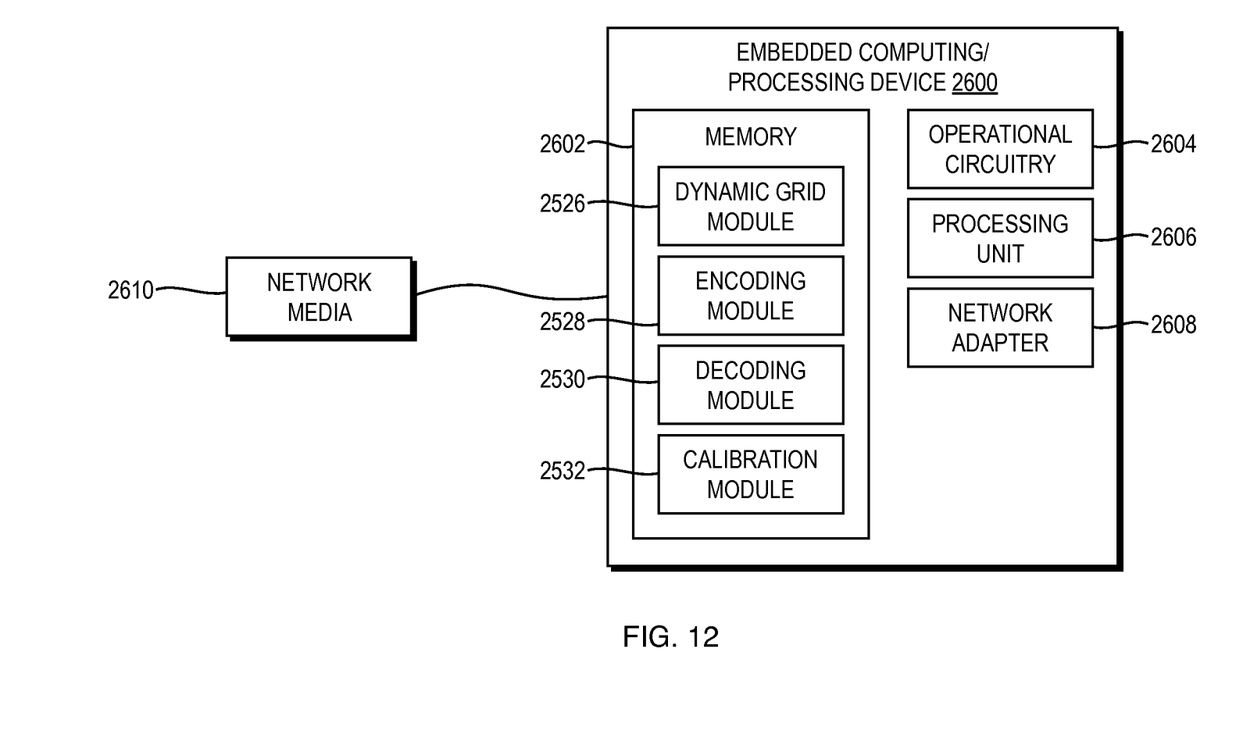
FIG. 12 is an example computational device block diagram depicting various of the components which can be used to implement various of the disclosed embodiments in a mobile device, such as a cellular phone.

Exemplary methods may also be implemented and executed on one or more embedded computing devices. FIG. 12 is a block diagram of an exemplary embedded computing or processing device 2600 that may be used to perform any of the methods or implement any of the systems and devices provided by exemplary embodiments. The embedded computing device 2600 may be any suitable device incorporating electronics to control operational functions, and in which computing and networking capabilities are embedded. For example, devices in which the computing and networking capabilities may be embedded may include, but are not limited to, audio-video equipment (e.g., audio and video recorders and players, televisions, digital cameras, digital video cameras, compact disks, digital video disks, camcorders, and the like), communication devices (e.g., telephones, cell phones, audio and video conferencing systems, the iPhone™ communication device, the iPad™ communication device, and the like), entertainment devices (e.g., settop boxes, game consoles, and the like), and the like.

The embedded computing device 2600 may include memory 2602 that includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. Memory 2602 may include a computer system memory or random access memory, such as DRAM, SRAM, EDO RAM, and the like. Memory 2602 may include other types of memory as well, or combinations thereof.

Memory 2602 may include a dynamic grid module 2526 for storing data and computer-readable instructions and/or software that implement and perform methods associated with setting up, configuring and/or re-configuring one or more dynamically configurable barrier grids. Memory 2602 may include an encoding module 2528 for storing data and computer-readable instructions and/or software that implement and perform methods associated with feeding image data to sequentially adjacent columns of an image display panel associated with a barrier grid. Memory 2602 may include a decoding module 2530 for storing data and computer-readable instructions and/or software that implement and perform the methods associated with selection of 2D or 3D viewing on an autostereoscopic image display system. Memory 2602 may include a calibration module 2532 for storing data and computer-readable instructions and/or software that implement and perform the methods associated with calibrating a barrier grid to an image display and/or calibrating an image display to a barrier grid.

The embedded computing device 2600 may include operational circuitry 2604 that operate device functions. The embedded computing device 2600 may include one or more processing units 2606 to provide embedded computing capabilities, for example, for setting up and/or configuring a dynamically configurable barrier grid. The processing unit 2606 may execute computer-executable instructions or software for implementing exemplary embodiments, and one or more other programs for controlling system hardware, for example, for setting up and/or configuring a dynamically configurable barrier grid. The processing unit 2606 may have hardware interfaces to the operational circuitry 2604 that operate device functions. The processing unit 2606 may be one or more microprocessors or one or more microcontrollers.

The embedded computing device 2600 may include one or more network adapters 2608 for connecting with a network media 2610 that is interconnected with a computer network. The network adapter 2608 may be a network interface card suitable to the particular network media 2610. For example, exemplary network adapters 2608 may include, but are not limited to, a built-in network adapter, network interface card, PCMCIA network card, card bus network adapter, wireless network adapter, USB network adapter, modem or any other device. The network media 2610 may be any type of wired or wireless network media including, but not limited to, Ethernet, firewire, radio frequency, television cable, Local Area Network (LAN), Wide Area Network (WAN) or the Internet through a variety of connections including, but not limited to, standard telephone lines, LAN or WAN links (for example, 802.26, T1, T3, 56kb, X.25), broadband connections (for example, ISDN, Frame Relay, ATM), wireless connections, controller area network (CAN), or some combination of any or all of the above.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for locating and reserving a room in a building of a campus, the method comprising:
    capturing a media access control (MAC) address from mobile device associated with a user;
    identifying the MAC address as a user identification code;
    displaying, via a graphical user interface of a computational device, a graphical representation of a hierarchical node relationship of locations within an area with respect to a view of the area;
    receiving, from the graphical user interface of the computational device, input from a user identifying features associated with a room and a specified location within the area;
    retrieving, from a floorplan database, floorplan level mapping information of the specified location;
    retrieving, from a security database, floorplan level security information associated with the user identification code;
    retrieving, from a facilities database, available facilities information, based on the identifying features;
    generating a list of potential reservation locations having the identifying features input by the user based on one or more of the floorplan level mapping information, the available facilities information, and the floorplan level security information;
    determining at least a first one of the potential reservation locations as being inaccessible for the user identification code based on the floorplan level security information;
    instructing the graphical user interface of the computational device to render at least a portion of the list of potential reservation locations within an interactive map, wherein the at least first one of the potential reservation locations determined to be inaccessible is obscured or eliminated from the list of potential reservation locations rendered within the interactive map;

displaying, via the graphical user interface of the computational device, an input field disposed with respect to the interactive map;

receiving, via the graphical user interface of the computational device, selection of at least a second one of the potential reservation locations on the interactive map;

automatically populating the input field with information associated with the at least second one of the potential reservation locations; and in response to automatically populating the input field with information associated with the at least second one of the potential reservation locations, instructing the graphical user interface to render the at least second one of the potential reservation locations on the interactive map in a different color than a remainder of the interactive map based on the available facilities information, the floorplan level security information and the user identification code.

2. The computer-implemented method of claim 1, wherein receiving a user identification code comprises identifying a mobile device associated with the user.

3. The computer-implemented method of claim 1, further comprising retrieving building level security information based on the user identification code.

4. The computer-implemented method of claim 3, further comprising retrieving campus level security information based on the user identification code.

5. The computer-implemented method of claim 1, further comprising retrieving campus level mapping information and building level mapping information.

6. The computer-implemented method of claim 5, further comprising displaying an image based on one of the campus level mapping information, the building level mapping information, and the floorplan level mapping information, in an image region.

7. The method of claim 1, further comprising creating a reservation in response to receiving, from the graphical user interface of the computational device, a selection of at least one of the potential reservation locations by a user.

8. A non-transitory computer readable medium comprising instructions configured to cause a computational device to:

capture a media access control (MAC) address from mobile device associated with a user;

identify the MAC address as a user identification code;

display, via a graphical user interface of a computational device, a graphical representation of a hierarchical node relationship of locations within an area with respect to a view of the area;

receive, from the graphical user interface of the computational device, input from a user identifying features associated with a room and a specified location within the area;

retrieve, from a floorplan database, floorplan level mapping information of the specified location;

retrieve, from a security database, floorplan level security information associated with the user identification code;

retrieve, from a facilities database, available facilities information, based on the identifying features;

generate a list of potential reservation locations having the identifying features input by the user based on one or more of the floorplan level mapping information, the available facilities information, and the floorplan level security information;

determine at least a first one of the potential reservation locations as being inaccessible for the user identification code based on the floorplan level security information;

instruct the graphical user interface of the computational device to render at least a portion of the list of potential reservation locations within an interactive map, wherein the at least first one of the potential reservation locations determined to be inaccessible is obscured or eliminated from the list of potential reservation locations rendered within the interactive map;

display, via the graphical user interface of the computational device, an input field disposed with respect to the interactive map;

receive, via the graphical user interface of the computational device, selection of at least a second one of the potential reservation locations on the interactive map;

automatically populate the input field with information associated with the at least second one of the potential reservation locations; and in response to automatically populating the input field with information associated with the at least second one of the potential reservation locations, instruct the graphical user interface to render the at least second one of the potential reservation locations on the interactive map in a different color than a remainder of the interactive map based on the available facilities information, the floorplan level security information and the user identification code.

9. The non-transitory computer readable medium of claim 8, wherein receiving a user identification code comprises identifying a mobile device associated with the user.

10. The non-transitory computer readable medium of claim 8, the instructions further configured to cause a computational device to retrieve building level security information based on the user identification code.

11. The non-transitory computer readable medium of claim 10, the instructions further configured to cause a computational device to retrieve campus level security information based on the user identification code.

12. The non-transitory computer readable medium of claim 8, the instructions further configured to cause a computational device to retrieve campus level mapping information and building level mapping information.

13. The non-transitory computer readable medium of claim 12, the instructions further configured to cause a computational device to display an image based on one of the campus level mapping information, the building level mapping information, and the floorplan level mapping information, in an image region.

14. A computerized reservation system for receiving a room reservation request comprising:

a memory;

a processor programmable to:

capture a media access control (MAC) address from mobile device associated with a user;

identify the MAC address as a user identification code;

display, via a graphical user interface of a computational device, a graphical representation of a hierarchical node relationship of locations within an area with respect to a view of the area;

receive, from the graphical user interface of the computational device, input from a user identifying features associated with a room and a specified location within the area;

retrieve, from a floorplan database, floorplan level mapping information of the specified location;

retrieve, from a security database, floorplan level security information associated with the user identification code;

retrieve, from a facilities database, available facilities information, based on the identifying features;

generate a list of potential reservation locations having the identifying features input by the user based on one or more of the floorplan level mapping information, the available facilities information, and the floorplan level security information;

determine at least a first one of the potential reservation locations as being inaccessible for the user identification code based on the floorplan level security information;

instruct the graphical user interface of the computational device to render at least a portion of the list of potential reservation locations within an interactive map, wherein the at least first one of the potential reservation locations determined to be inaccessible is obscured or eliminated from the list of potential reservation locations rendered within the interactive map;

display, on the graphical user interface of the computational device, an input field disposed with respect to the interactive map;

receive, on the graphical user interface of the computational device, selection of at least a second one of the potential reservation locations on the interactive map;

automatically populate the input field with information associated with the at least second one of the potential reservation locations; and in response to automatically populating the input field with information associated with the at least second one of the potential reservation locations, instruct the graphical user interface to render the at least second one of the potential reservation locations on the interactive map in a different color than a remainder of the interactive map based on the available facilities information, the floorplan level security information and the user identification code.

15. The computerized reservation system of claim 14, the processor further programmable to retrieve building level security information based on the user identification code.

* * * * *